United States Patent
Chan et al.

(10) Patent No.: US 9,531,508 B2
(45) Date of Patent: Dec. 27, 2016

(54) METHODS AND SYSTEMS FOR ESTIMATING MISSING DATA

(71) Applicant: PISMO LABS TECHNOLOGY LIMITED, Hong Kong (HK)

(72) Inventors: Ho Ming Chan, Hong Kong (HK); Patrick Ho Wai Sung, Hong Kong (HK); Kam Chiu Ng, Hong Kong (HK); Alex Wing Hong Chan, Hong Kong (HK); Kit Wai Chau, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 39 days.

(21) Appl. No.: 14/695,376

(22) Filed: Apr. 24, 2015

(65) Prior Publication Data
US 2015/0288487 A1    Oct. 8, 2015

Related U.S. Application Data

(63) Continuation-in-part of application No. 12/646,774, filed on Dec. 23, 2009, now Pat. No. 9,019,827.

(51) Int. Cl.
*H04L 1/18* (2006.01)
*H04L 1/16* (2006.01)
*H04L 12/46* (2006.01)

(52) U.S. Cl.
CPC ............ *H04L 1/189* (2013.01); *H04L 1/1642* (2013.01); *H04L 12/4633* (2013.01)

(58) Field of Classification Search
CPC .......... H04L 1/189; H04L 47/34; H04L 47/41; H04L 1/1642; H04L 12/4633
See application file for complete search history.

(56) References Cited

U.S. PATENT DOCUMENTS

| | | | |
|---|---|---|---|
| 6,810,377 B1 * | 10/2004 | Ho ........................ | G10L 19/005 704/208 |
| 7,586,899 B1 * | 9/2009 | Mohaban .......... | H04L 29/06027 370/352 |

(Continued)

FOREIGN PATENT DOCUMENTS

CN         103618678 A        3/2014

OTHER PUBLICATIONS

International Search Report in International Application No. PCT/IB2015/052998, mailed on Jan. 27, 2016.

(Continued)

*Primary Examiner* — Robert M Morlan
*Assistant Examiner* — Mandish Randhawa

(57) ABSTRACT

The present invention discloses methods and systems for recreating missing data packets of a data session established between a first communications router and a second communications router through an aggregated connection. The first communications router receives data packets belonging to a data session from the second communications router through the aggregated connection. The data packets are destined to a first host reachable through the first communications router. The first communications router transmits the data packets to the first host and determines whether there is one or more missing data packets. If there is one or more missing data packets, the first communications router determines global sequence number(s) (GSN) and per tunnel sequence numbers (PTSN) of the one or more missing data packets and recreates payload(s) of the one or more missing data packet(s). One or more new data packets are then transmitted to the first host. The one or more new data packets comprise payload of the one or more missing data packets and are assigned with GSN(s) and PTSN(s) of the one or more missing data packets.

16 Claims, 12 Drawing Sheets

(56) References Cited

U.S. PATENT DOCUMENTS

| | | | | |
|---|---|---|---|---|
| 2004/0136564 | A1* | 7/2004 | Roeber | G06F 3/0488 |
| | | | | 382/100 |
| 2004/0236855 | A1 | 11/2004 | Peles | |
| 2006/0104366 | A1* | 5/2006 | Huang | H04N 19/147 |
| | | | | 375/240.27 |
| 2007/0055498 | A1* | 3/2007 | Kapilow | G10L 19/005 |
| | | | | 704/206 |
| 2008/0228435 | A1* | 9/2008 | Lee | G03F 7/705 |
| | | | | 702/150 |
| 2009/0310485 | A1* | 12/2009 | Averi | H04L 45/00 |
| | | | | 370/232 |
| 2011/0191111 | A1* | 8/2011 | Chu | G10L 19/005 |
| | | | | 704/500 |
| 2012/0314578 | A1 | 12/2012 | Averi et al. | |
| 2015/0288487 | A1 | 10/2015 | Chan et al. | |

OTHER PUBLICATIONS

Written Opinion of the international Searching Authority in International Application No. PCT/IB2015/052998, mailed on Jan. 27, 2016.

* cited by examiner

Fig. 4B

| Type | Data 1 | Data 2 |
|---|---|---|
| BWOPT_VERSION (0x01) | Version of this packet. Currently it is 1. | Nil |
| BWOPT_MAX_WAN (0x02) | Maximum number of WAN connections on the sender | Nil |
| BWOPT_WAN_MAXBW (0x03) | Number of 32 bit words in the Data filed | WAN connection's maximum downlink bandwidth in kbyte per sec. 32-bit word for each WAN. |
| BWOPT_DROP_RATE (0x04) | Number of 32-bit words in the Data field. This must be 2. | First 32-bit word is the number of packet dropped. Second 32-bit word is the total packet received. |

METHODS AND SYSTEMS FOR ESTIMATING MISSING DATA

RELATED APPLICATIONS

The present application is a Non-provisional Continuation-in-part application which claims the benefits of and is based on Non-provisional application Ser. No. 12/646,774 titled "Throughput Optimization for Bonded Variable Bandwidth Connections", filed on 23rd Dec. 2009. The contents of the above-referenced application are herein incorporated by reference.

TECHNICAL FIELD

The present invention relates in general to the field of computer networking. More particularly, the present invention discloses methods and systems for recreating missing data packets of a data session established between a first communications router and a second communications router through an aggregated connection.

BACKGROUND ART

A multi Wide Area Network (WAN) Site-to-Site VPN router is a router that supports aggregating the bandwidth of multiple interconnections, e.g., WAN connections for accessing one or more remote private networks. In some implementations, each TCP/IP session is routed to only one WAN. In this configuration, a single TCP file transfer session can only utilize the bandwidth of one WAN connection on each end. For example, in a session based site-to-site virtual private network (VPN) connection VPN traffic is routed to multiple WAN connections between two sites (e.g., sites A and B).

In one implementation, M×N tunnels are initially formed between the WAN connections where M and N are the number of WAN network connections of site A and site B, respectively. Application TCP/IP sessions are then routed over the different tunnels. It is notable, however, that while a session based site-to-site VPN is able to utilize different tunnels for different sessions, a single download session in this type of connection is only able to utilize one tunnel.

When there is packet loss or packet drop in a data session between two routers, there may be various ways to recover the lost packets. It is common that the sender router resends dropped or lost data packets until the receiving router receives the data packets and sends corresponding acknowledgement. However, this may consume bandwidth and increase network congestion. Higher network congestion may result into more packet drop. Therefore, a solution is required such that the dropped or lost packets may be recovered without the sending device resending the data packets.

DISCLOSURE OF INVENTION

Summary of Invention

The present invention discloses methods and systems for recreating missing data packets of a data session established between a first communications router and a second communications router through an aggregated connection. When the first communications router receives data packets belonging to a data session from the second communications router through the aggregated connection, the first communications router transmits the data packets to the first host and determines whether there is one or more missing data packets. If there is one or more missing data packets, the first communications router determines global sequence number(s) (GSN) and per tunnel sequence numbers (PTSN) of the one or more missing data packets and recreates payload(s) of the one or more missing data packet(s). One or more new data packets are then transmitted to the first host. The one or more new data packets comprise payload of the one or more missing data packets and are assigned with GSN(s) and PTSN(s) of the one or more missing data packets.

According to one of the embodiments of the present invention, payloads of the one or more missing data packets are recreated based on one or more previous data packets of the same data session and/or one or more next data packets of the same data session.

According to one of the embodiments of the present invention, payloads of the one or more missing data packets are recreated by calculating an average value of payloads of the one or more previous data packets and/or one or more next data packets.

According to one of the embodiments of the present invention, payloads of the one or more missing data packets are recreated based on, at least in part, a variance value and an average value of payloads of the one or more previous data packets and/or one or more next data packets. Payload of the missing data packet is calculated using a combination of the average and standard deviation of payloads of the one or more previous data packets and/or one or more next data packets.

According to one of the embodiments of the present invention, payloads of the one or more missing data packets are recreated by performing a lookup of an audio database. Alternatively, payloads of the one or more missing data packets are recreated by performing a lookup of a text database. When there is more than one possibility for payload of the missing data packet, the first communications router selects one of the more than one possibility based on probability generated from historical data.

According to one of the embodiments of the present invention, payloads of the one or more missing data packets are recreated by using one or more of non-linear interpolation, nearest neighbor interpolation, bilinear interpolation, and bicubic interpolation.

According to one of the embodiments of the present invention, an average of transform coefficients of one or more previous data packets and/or one or more next data packets is calculated. The average of transform coefficients is then used as a first transform coefficient of the missing data packet. Inverse transformation is applied on the first transform coefficient and the missing data packet is recreated based on the inverse transformation of the first transform coefficient.

According to one of the embodiments of the present invention, a regression analysis model is created using payloads of one or more previous data packets and/or one or more next data packets, wherein payload of a data packet is a dependent variable. An approximation function is then determined from the regression analysis model. Payloads of the one or more missing data packets are recreated by calculating payload of the missing data packet using the approximation function. Independent variable of the regression analysis model may be time, GSN of the data packets, or a combination of time and GSN of the data packets.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data etc may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, an universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. An wireless access network may be implemented using infra-red, High-Speed Packet Access (HSPA), HSPA+, Long Term Evolution (LTE), WiMax, General packet radio service (GPRS), Global System for Mobile Communications (GSM), Enhanced Data rates for GSM Evolution (EDGE), Code division multiple access (CDMA), WiFi, CDMA2000, Wideband CDMA (WCDMA), Time Division CDMA (TD-SCDMA), BLUETOOTH, WiBRO, Evolution Data Optimized (EV-DO); Digital Enhanced Cordless Telecommunications (DECT), Digital AMPS (IS-136/TDMA), Integrated Digital Enhanced (iDEN) or any other wireless technologies. For example, a network interface may be used as a local area network (LAN) interface or a wide area network (WAN) interface.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may in certain embodiments, be downloaded via computer networks such as the Internet, an intranet, LAN, metropolitan area network (MAN), wide area network (WAN), the public switched telephone network (PSTN), a satellite communication system, a cable transmission system, and/or the like.

FIG. 1A illustrates system 100 adapted according to embodiments configured to optimize the throughput of bonded multiple variable bandwidth connections by adjusting a tunnel bandwidth weighting schema during a data transfer session. System 100 includes multiple sites 102 and 104, which each comprise at least one network node. A network node may be referred to as a communications router. However the scope of the invention is not limited to communications routers, such that the invention can be carried out at gateways, routers, servers, or any other types of network nodes. For simplicity, FIG. 1A illustrates that sites 102 and 104 comprise communications router 106 and 108 respectively. Communication routers 106 and 108 may be embodied as multi WAN routers which support aggregating the bandwidth of multiple Internet connections. Communications routers 106 and 108 are connected over network 110. Network 110 may comprise a LAN, MAN, WAN, wireless network, the PSTN, the Internet, an intranet, an extranet, etc.

Site 102 and router 106 may comprise M connections 112, and site 104 and router 108 may comprise N connections 114. Connections 112 and 114 are data connections for communicating information within network 110 between sites 102 and 104. In the illustrated embodiment, M is equal to 3 and N is equal to 2; however, these values may vary according to desired routers and configurations. Connections 112 and 114 may have similar or differing bandwidth capabilities. Further, connections 112 and 114 may comprise different types of WAN connections, such as a WiFi, cable, DSL, TI, 3G, 4G, satellite connections, and the like. It is also noted that site 102 and site 104 may be thought of as both a sender or receiver, and discussions regarding the functionality of either site may be implemented on the other site. In other words, system 100 may be implemented as a symmetrical network.

FIG. 16 illustrates a network environment according to one of the embodiments of the present invention. Tunnels 103A, 103B and 103C are established between communications router 106 and communications router 108. Tunnels 103A, 103B and 103C may be bonded to form an aggregated connection.

Communications routers 106 and 108 may have a plurality of network interfaces according to one of the embodiments. Communications router 106 establishes tunnels 103A, 103B, and 103C via one or more of its plurality of network interfaces with one or more network interfaces of communications router 108.

Communication device 106 and 108 may work as a gateway, a router, a switch, an access point, a hub, a bridge, etc.

FIG. 1C illustrates system 100 adapted according to embodiments configured to optimize the throughput of bonded multiple variable bandwidth connections. System 100 is similar to system 101, with the exception of M×N virtual tunnels 116. When establishing a bonded connection between sites 102 and 104, such as by implementing a bonded site-to-site VPN connection, M×N tunnels 116 may be created. Tunnels 116 correspond to a unique permutation of the network connections of site 102 and the network connections of site 104. An aggregated connection may be formed between communications routers 106 and 108. Tunnels 116 may be virtual tunnels.

A plurality of established tunnels 116 may be aggregated, combined or bonded together to form one aggregated connection. Those skilled in the arts would appreciate that there are myriad ways to aggregate, combine, or bond a plurality of established tunnels to form one aggregate tunnel. An aggregated connection is perceived as one tunnel by sessions or applications that are using it. An aggregated connection may be an end-to-end connection, a virtual private network connection or connectionless oriented connection. For example, an aggregated connection may be a TCP connection or UDP connection. In another example, aggregated connection is an aggregation of a plurality of tunnels, and each tunnel is linked between communications router 106 and communications router 108. In another example, an aggregated connection may be a VPN tunnel, comprising a plurality of established tunnels, and each established tunnel is linked between communications router 106 and communications router 108.

FIG. 2A shows a high level flow diagram of operation of system 100 depicting a method 200 for increasing throughput of a bonded connection. It should be appreciated that the particular functionality, the order of the functionality, etc. provided in FIG. 2 is intended to be exemplary of operation in accordance with the concepts of the present invention. Accordingly, the concepts herein may be implemented in various ways differing from that of the illustrated embodiment.

At block 201 of the illustrated embodiment when establishing a bonded connection between routers 102 and 104, such as by implementing a bonded site-to-site VPN connection, M×N virtual tunnels 116 may be created, as illustrated in FIG. 1C. Virtual tunnels 116 correspond to a unique permutation of the network connections of site 102 and the network connections of site 104.

At black 202 of the illustrated embodiment, default weights for the tunnels are determined and/or assigned. To determine default weights embodiments exchange uplink and downlink bandwidth data of connections 112 and 114 between sites 102 and 104. Using this bandwidth data, a default weight may be calculated according to the following: suppose site 102's downlink bandwidths of connections 1 to m are d1, d2, . . . dm, and site 104's uplink bandwidths of connections 1 to n are ur, U2, . . . Un; the default weight for the tunnel between site 102's connection X and site 104's connection Y may be defined as DW(x,y), where DW(x,y)= $d_x \cdot d_y$.

Using the above method to calculate default weight, if connections 112-1 through 112-3 are WAN connections of a multi WAN router with respective uplink/downlink bandwidths of 10M/6M, 8M/4M, and 6M/6M, and connections 114-1 through 114-2 are WAN connections of a multi WAN router with respective uplink/downlink bandwidths of 7M/5M and 9M/3M, the respective default weights for each tunnel will be as follows:

| For site 102 | For site 104 |
| --- | --- |
| DW(1,1) = 6 * 7 = 42 | DW(1,1) = 5 * 10 = 50 |
| DW(1,2) = 6 * 9 = 54 | DW(1,2) = 5 * 8 = 40 |
| DW(2,1) = 4 * 7 = 28 | DW(1,3) = 5 * 6 = 30 |
| DW(2,2) = 4 * 9 = 36 | DW(2,1) = 3 * 10 = 30 |
| DW(3,1) = 6 * 7 = 42 | DW(2,2) = 3 * 8 = 24 |
| DW(3,2) = 6 * 9 = 54 | DW(2,3) = 3 * 6 = 18 |

It is noted that other ways to calculate default weight are contemplated, and the above is simply an example of the implementation of an embodiment of the present invention. It is noted that many different weighting schema may be used to define the initial bandwidth of a tunnel. For example, one may desire to only weight a tunnel in one direction using the downlink capacity of a receiving site and the uplink capacity of the sending site. Any weighting scheme used to characterize capacity of the tunnels at the establishment of the bonded connection may be used for the purposes of the present invention.

When packets are being routed from site 102 to site 104 according to embodiments, the packets will be distributed to the tunnels in a ratio according to an effective weight, EW(x,y). Initially the effective weight of embodiments is set to be equal to the default weight, EW(x,y)=DW(x,y), and if the bandwidth of tunnels 116 remains unchanged from the initial setting, the effective weight is optimal for packet distribution. However, if a user is downloading a file over a bonded network connection in a TCP session with one or more tunnels having packet drops, the overall throughput of the session will drop dramatically. This is in part because the packet drops will keep causing TCP retransmissions and TCP's flow control will maintain a lower throughput even though tunnels without packet drops are not fully occupied.

One effective way to increase throughput would be to avoid such packet drops. To do so, embodiments of the present invention discern when tunnels are experiencing an increase or decrease in packet drop rates at block 203 of the illustrated embodiment. Embodiments further function to modify the effective weight of tunnels which are experiencing or have experienced changes in packet drop rates at block 204. The packet drop rate information may be monitored continuously or be monitored based on specific time periods. Once it is determined that a tunnel is experiencing an unacceptable rate of packet drops (block 204-1), the illustrated embodiment decreases the effective weight of the tunnel at block 204-2. In some embodiments, unacceptable may mean that the packet drop rate is a non-zero quantity, while other embodiments may determine that an unacceptable rate is any rate beyond a predefined threshold. Embodiments implement these decreases in stepwise fashion, in a continuous manner, in a reduction at one time in proportion to the increase in the packet drop rate, etc. When reductions are done in a gradual manner, embodiments may continue to monitor the tunnel in order to optimize the amount of reduction which is implemented.

Tunnels 116 may be established or monitored by sending heartbeat packets through each tunnel from either router 106 or router 108. In some embodiments when the receive end fails to receive heartbeat packets from a tunnel for a period of time, it will treat that tunnel as down and the tunnel will not be used for routing traffic. If heartbeat packets again start being received, the tunnel may be re-established and be weighted along with the other tunnels. As such, in the event that all packets are being dropped in a tunnel and the effective weight of that tunnel is reduced to zero, embodiments may utilize heartbeat packets to monitor and reestablish a connection.

Moreover, when tunnels recover all or part of their respective bandwidths, e.g. it is determined that the packet drop rate decreases (block 204-3), the illustrated embodiment functions to increase the effective weight of such tunnels (block 204-4) in order to fully, or more fully, utilize the bandwidth. Some embodiments increase the effective weight for a tunnel using predetermined step sizes until an accurate effective weight is regained. Other embodiments increase the effective weight proportionate to a newly measured bandwidth which may correspond to a newly measured packet drop rate. Moreover, embodiments may increase the effective weight for a tunnel based on a predetermined linear or exponential scale.

After the effective weight of the tunnels are adjusted, or it is determined that no adjustment is needed, the weighting scheme of the system is updated at block 205 of the illustrated embodiment. This update may comprise storing any processed information, using such information in further processing, causing the system to take no action, etc. For example, processing performed with respect to block 205 may operate to average weighting schemes over a period of time, such as to mitigate error associated with highly transient anomalies. Further, the updated information may be used on system 100 to modify the packet distribution of the data transfer session, as discussed with respect to FIG. 2B. System 100 may continue to implement steps 203-205 continuously or periodically throughout a data transfer session.

FIG. 2B illustrates an embodiment where, after weighting method 200 is implemented, the packets are distributed based, at least in part, on the modified weight of the tunnels. Specifically, block 206 of the illustrated embodiment operates to distribute packets across the tunnels in accordance with the weighting scheme determined by operation of method 200. In some embodiments, this distribution will change throughout a data transfer session, and therefore the steps of FIG. 2B are shown as repeating. Some embodiments change the packet distribution each time the system is updated at block 205. Moreover, block 205 may cause changes to be implemented periodically, in response to certain drop rate change thresholds, etc. It should be appreciated that the determination of weighting by operation of method 200 and the application of determined weighting to packet distribution at block 206 may have different periodicity. For example, method 200 may operate to provide updates of weighting scheme information using a relatively short iterative cycle while the distribution of packets is altered based upon such weighting scheme information using a longer iterative cycle.

To monitor the bandwidth of the various tunnels 115, some embodiments of the present invention encapsulate each transmitted IP packet with various information. FIG. 3 illustrates an example embodiment showing the type of information 300 which may be encapsulated in a transmitted IP packet. Version field 302 may contain information about the protocol version being utilized and protocol type field 303 may contain the protocol type of the payload packet. In general, the value of this field will correspond to the Ethernet protocol type for the packet. However, additional values may be defined in other documents. Tunnel ID field 304 may be a 32-bit field and may contain an identifier to identify the current tunnel of the IP packet. Advanced Encryption Standard (AES) initialization vector field 306 may be a 32-bit field and may contain an initialization vector for AES encryption. Global sequence number field 308 may be a 32-bit field and may contain a sequence number which is utilized to re-sequence each of the packets for various sessions into the proper order when they have emerged from their respective tunnels. Per tunnel sequence number field 310 may be a 32-bit field which may represent a sequence number that is assigned to each packet routed to a particular tunnel. AES encrypted payload field 312 may be utilized to convey the payload of the IP packet. AES encryption may be applied for higher security of the payload in order to prevent attacks from third parties. [51] The per tunnel sequence number discussed above may be used to monitor dropped packets in a tunnel. In one embodiment the router on the receiving end calculates the packet drop rate of each tunnel, $DR(x,y)$, every f seconds by monitoring the per tunnel sequence number of the received packets. $DR(x,y)$ may be characterized as the sequence numbers missed divided by a sequence number increase for a period f. The length of period f may vary, and in one embodiment f is equal to 5 seconds.

Other methods may also be used to monitor dropped packets, e.g.: the sender may periodically inform the receive end how many packets it has sent, the sender sends a heartbeat packet to the receive end every constant period of time and the receive end can estimate the overall drop rate by monitoring the heartbeat packets' drop rate, by acquiring drop rate figures from physical interface/device/layer, etc.

The receive end may feedback a particular tunnel's drop rate, effective weight, or other bandwidth indicators, to the sending router. When the sender receives information regarding packet drops, some embodiments lower the effective weight $EW(x,y)$ of a tunnel by $EW(x,y) \cdot DR(x,y)$. Other metrics may be used to modify the effective weight of a tunnel. In some embodiments, the sender may receive feedback and the effective weight may be reduced by number that is greater than or less than the packet drop rate. Such variances may be configured according to the particular needs of a communication system. The above example represents a metric that attempts to lower the effective weight of the tunnel to a weight which prevents further packet drops while maximizing the amount of usable bandwidth of the tunnel. Any metric which finds this balance may be preferred.

FIG. 4A illustrates an example embodiment of the type of information 400 which may be encapsulated in a feedback packet which is sent to the transmitting router in order to report packet drop rates or other bandwidth related data received at the receiving end router. Type field 402 may include data regarding the type of data that will be included in data-1 field 404 and data-2 field 406. Data-1 field 404 and data-2 field 406 may contain any information which may be used to assist the router in determining tunnel information with regard to the number of tunnels, bandwidth of tunnels, number of dropped packets in a tunnel, and the like. An example of possible values of the type field 402 in the data fields 404 and 406 is shown in the chart of FIG. 4B.

The information which is encapsulated in transmitted IP packets, such as shown in FIG. 3 and FIG. 4 may also be used for packet buffering and re-sequencing. Because each tunnel's latency can be different, when two consecutive packets of the same TCP session are sent to a VPN peer over a bonded VPN tunnel, they may not arrive in sequence because they are routed via two different tunnels. If the TCP session receives the out-of-sequence packets from the VPN, the TCP session will slow down due to TCP retransmissions. Accordingly, the receive end should buffer the packets that come too early until either the slower packets arrive or until an expiration time has passed. With such buffering, late packets that come prior to an expiration time will be forwarded to the destination device in sequence. This buffering assists in the optimization of end-to-end throughput.

It is noted that embodiments described herein are, at times, discussed in the context of a VPN connection. These discussions are presented in order to show an example embodiment of a bonded connection. The inventive concepts described in claimed herein are not limited to such connections. In fact, any connection where sufficient data may be obtained and exchanged in order to dynamically monitor the bandwidth of a plurality of communication paths which are being used in a data transfer session may be implemented with the embodiments of the present invention.

As discussed above, each packet may be assigned two different sequence numbers, a global sequence number (GSN) and a per tunnel sequence number (PTSN). These numbers may be used to assist in packet buffering and re-sequencing operations. After a packet is passed to an upper layer, the receive end may update a next expected per-tunnel sequence number (NE-PTSN) and a next expected global sequence number (NE-GSN).

The following will describe one method of how a packet may be buffered or forwarded to destination device after it is received and decrypted.

1. If the packet's GSN equals to zero, forward it to destination device immediately.
2. Check if the packet's PTSN equals to the NE-PTSN. If not, dequeue (forward to destination device) in sequence all packets that have a smaller GSN than the packet's. Keep the packet unprocessed.
3. Update the NE-PTSN (i.e., set NE-PTSN to PTSN+1).
4. If the GSN is less than the NE-GSN, forward to destination device.
5. If the packet's GSN is equal to the NE-GSN, update the NE-GSN (i.e., set NEGSN to GSN+1) and forward to destination device. Repeat updating the NE-GSN and dequeuing the buffer head from the buffer if the head's GSN equals to the new NE-GSN.
6. Otherwise (GSN is larger than the NE-GSN), enqueue the packet in the order of the GSN.
7. If a packet has been in the queue longer than a fixed amount of time, set the NEGSN to the packet's GSN+1 and dequeue in sequence the packet and all packets that have a smaller GSN than the packet's.

Therefore, the encapsulated packet information discussed in FIG. 2 and FIG. 3 may include information that optimizes overall throughput of the data transmission system, such as 100, both by assisting in the optimization of tunnel bandwidth in response to monitoring packet drop rates, and by assisting in the efficient re-sequencing of received packets in a data transfer session.

FIG. 5 illustrates an exemplary processor based system 500 which may be employed to implement the systems, devices, and methods according to certain embodiments. Processor-based system 500 may represent the architecture of communications router 106 and 108. Central processing unit (CPU) 501 is coupled to system bus 502. CPU 501 may be any general purpose CPU, or may be a special purpose CPU designed to implement the above teachings. The present disclosure is not restricted by the architecture of CPU 501 (or other components of exemplary system 500) as long as CPU 501 (and other components of system 500) supports the inventive operations as described herein. CPU 501 may execute the various logical instructions described herein. For example, CPU 501 may execute machine-level instructions according to the exemplary operational flow described above in conjunction with FIG. 2. When executing instructions representative of the operational steps illustrated in FIG. 2, CPU 501 becomes a special-purpose processor of a special purpose computing platform configured specifically to operate according to the various embodiments of the teachings described herein.

System 500 also includes random access memory (RAM) 503, which may be SRAM, DRAM, SDRAM, or the like. RAM 503 may be a secondary storage which stores program instructions executable by CPU 501. System 500 includes read-only memory (ROM) 504 which may be PROM, EPROM, EEPROM, or the like. RAM 503 and ROM 504 hold user and system data and programs, as are well known in the art.

System 500 also includes input/output I/O)(adapter 505, communications adapter 511, user interface adapter 508, and display adapter 509. I/O adapter 505, user interface adapter 508, and/or communications adapter 511 may, in certain embodiments, enable a user to interact with system 500 in order to input information.

I/O adapter 505 connects storage device(s) 506, such as one or more of hard drive, compact disc (CD) drive, floppy disk drive, tape drive, etc., to system 500. The storage devices are utilized in addition to RAM 503 for the memory requirements associated performing the operations discussed in the above embodiments. Communications adapter 511 is adapted to couple system 500 to network 512, which may enable information to be input to and/or output from system 500 via such network 512 (e.g., the Internet or other wide-area network, a local-area network, a public or private switched telephony network, a wireless network, any combination of the foregoing). Communications adapter 511 may be regarded as a network interface, and system 500 may comprise a plurality of communications adapters 511. User interface adapter 508 couples user input devices, such as keyboard 513, pointing device 507, and microphone 514 and/or output devices, such as speaker(s) 515 to system 500. Display adapter 509 is driven by CPU 501 to control the display on display device 510. Display adapter 509 transmits instructions for transforming or manipulating the state of the various numbers of pixels used by display device 510 to visually present the desired information to a user. Such instructions include instructions for changing state from on to off, setting a particular color, intensity, duration, or the like. Each such instruction makes up the rendering instructions that control how and what is displayed on display device 510.

FIG. 6 illustrates a network environment based on the network environment illustrated in FIG. 1A. One of the LAN interface of communications router 106 is connected to host 103 and one of the LAN interface of communications router 108 is connected to host 105. Hosts 103 and 105 are in sites 102 and 104 respectively. A plurality of tunnels may be established between communications routers 106 and 108 through network 110. Communications router 106 may establish tunnels with communications router 108 through one or more WAN interfaces of communications router 106 and one or more WAN interfaces of communications router 108. For illustration purpose only, communications router 108 connects to the Internet 110 through three connections while communications router 106 connects to the network 110 through two connections. Network 110 may be an interconnected network, such as the internet.

When data packets of a data session established between communications router 106 and 108 are lost or dropped, communications router 108 determines that there are one or more missing data packets. If the missing data packets are resent by communications router 106, bandwidth consumption increases, which may result into network congestion. The present invention discloses how communications router 108 can estimate contents of the missing data packets, such that communications router 106 need not resend the missing data packets.

FIG. 7 is a flowchart illustrating a process according to one of the embodiments of the present invention. Viewing in conjunction with FIG. 1A, for example, when host 103 transmits a data packet destined to host 105, the data packet is transmitted from host 103 to host 105 through communications router 106, internet 110 and communications router 108. When the data packet arrives at communications router 106 from host 103, communications router 106 forwards the data packet to communications router 108 through internet 110. The process of FIG. 2 is then performed at communications router 108. Communications router 108 receives the data packet from communications router 106 through the aggregated connection in step 701. If the data packet belongs to a data session, when communications router 108 receives the data packet, a data session that the data packet belongs to is determined in step 702. The data packet can then be used for creating one or more previous and/or next data packet of the data session in step 703.

Communications router 108 may perform step 703 using various techniques which will be discussed in greater detail below.

FIG. 8 is a flowchart illustrating a process according to one of the embodiments of the present invention. For example, a data session is established between host 103 and host 105. Data packets belonging to the data session are transmitted from host 103 to host 105 through communications router 106, communications router 108 and internet 110. Communications router 108 receives data packets of the data session in step 801. Communications router 108 may then determine in step 802 whether there is/are any missing data packets. If there is a missing data packet, and the missing data packet is determined in step 803 not to be the first or last in sequence of the data session, the missing data packet can be created based on previous data packet and next data packet of the data session in step 804. If the missing data packet is first or last in sequence of the data session, communications router 108 sends a request in step 805 to communications router 106 to resend the missing data packet, as it may not be feasible to create the missing data packet based on only one or more previous or one or more next data packets. For example, if communications router 108 is configured to create the missing data packet by calculating an average value of payload of one or more previous data packets and payload of one or more next data packets, communications router 108 is not able to create the missing data packet based on only one or more previous or only one or more next data packets. The missing data packets that are created may be less accurate if only previous data packets or only next data packets are used. The process ends in step 806.

According to one of the embodiments, communications router 108 calculates variance and standard deviation of payload values of one or more previous data packets and one or more next data packets. In one variant, payload of the missing data packet is created by adding the standard deviation value and average value of payload values of one or more previous data packets and/or one or more next data packets. In another variant, payload of the missing data packet is created by subtracting the standard deviation value from average value of payload values of one or more previous data packets and/or one or more next data packets. The scope of the invention is not limited to adding or subtracting the standard deviation value and average value, such that payload of the missing data packet can be calculated by using other combinations of average value, variance value, and standard deviation value, or can be equal to the variance value or standard deviation value.

In one variant, communications router 108 determine whether there are missing data packets by checking global sequence number of the data packets. For example, when data packets with global sequence numbers 0001, 0002, 0003, 0004, and 0006 are received, communications router 108 may determine that data packets with global sequence number 0005 is a missing data packet. Communications router 108 may then create the missing data packet with global sequence number 0005 based on the previous data packet with global sequence number 0004 and next data packet with global sequence number 0006.

Below is an illustration of creating payload, P4, of a missing data packet by calculating an average of payloads, P1, P2 and P3, of three previous data packets respectively. For example:

P1=0000 00 40 B8 50 A5 AC 00 07 53 02 17 D1 08 00 45 00
P2=0010 05 D4 58 B4 40 00 2B 06 F4 4A D8 5C 63 1D C0 A8
P3=0020 01 02 00 50 0B F6 9E FC 46 4A AB DB A4 F8 50 10

In one variant, the average value of payloads is calculated by adding each byte of the payloads individually as follows:
P4=(P1+P2+P3)/3
P4=(0030 06 116 110 154 F0 1A2 C9 109 18D 96 19A 208 10F 115 155 B8)/3
P4=10 02 5C 5A 71 50 8B 43 58 84 32 88 AD 5A 5C 71 3D In another variant, the average value of the payloads is calculated by adding all bytes of the payloads together as follows:
P4=(P1+P2+P3)/3
P4=(3007171154F1A200000000000000000000)/3
P4=10025D05C6FB360000000000000000000000

According to one of the embodiments of the present invention, the missing data packet is created based on only one or more previous data packets of the same data session. For example, if a data packet with GSN 0005 is the missing data packet, the missing data packet is created based on a previous data packet with GSN 0004. When the missing data packet is recreated at communications router 108 as a new data packet, the new data packet is assigned a GSN 0005. The previous and new data packets, along with the new data packet is then transmitted to host 105 in the following order: the previous data packet with GSN 0004, the new data packet with GSN 0005, and the next data packet with GSN 0006. When the new data packet is based only on the previous data packet, payload of the new data packet is the same as payload of the previous data packet, i.e. data packet with GSN 0004.

In one variant, PTSN is assigned to the new data packet. The PTSN of the new data packet is assigned randomly. As the new data packet is created at communications router 108 and not received through any tunnel, the PTSN is assigned randomly.

Alternatively, PTSN of the missing data packet is determined and PTSN assigned to the new data packet is the same as PTSN of the missing data packet. For example, communications router 108 receives data packets with PTSN 0001A, 0002A, 0003A, 0005A through tunnel 103A. GSNs of the received data packets are 0001, 0003, 0004, and 0007 respectively. Data packets with GSNs 0002, and 0005 have been received through tunnel 103B. Hence, communications router 108 determines that a data packet with GSN 0006 and PTSN 0004A is a missing data packet. Therefore, the new data packet is assigned with GSN 0006 and PTSN 0004A.

In another variant, communications router 106 sends a management message to communications router 108. The management message comprises a list of GSN of data packets and corresponding PTSN of the data packets. Therefore, when GSN of a missing data packet is known, PTSN of the missing data packet can be determined.

In one variant, payload of the new data packet is an average value of payloads of the one or more previous data packets. Header of the new data packet contains information same as the header of other data packets of the data session, except for the GSN. The GSN of the new data packet is different from other data packets of the data session, as GSN should be unique.

According to one of the embodiments of the present invention, the missing data packet is created based on only one or more next data packets. For example, if a data packet with GSN 0005 is the missing data packet, the missing data packet is created based on a next data packet with GSN 0006. When the missing data packet is created at communications router 108 as a new data packet, the new data packet is assigned a GSN 0005. When the new data packet is based only on one next data packet, payload of the new data packet may be the same as payload of the next data packet, i.e. data packet with GSN 0006. Alternatively, when the new data packet is based on more than one next data packets, payload of the new data packet may be the average value of payloads of the one or more next data packets.

According to one of the embodiments of the present invention, communications router 108 has audio processing capabilities. When audio packets are received at communications router 108, the audio packets are saved temporarily, such that processing unit of communications router 108 can use the payload of the audio packets in order to create an audio database. This may especially be beneficial when the audio packets contain speech. The processing unit performs a lookup of the audio database for recreating payload of a missing data packet. For example, a word "apple" is present in an audio clip. The word "apple" may be comprised in one or more data packets, and communications router 108 stores the data content, or payload corresponding to the word "apple" in the audio database. For illustration purpose, word "apple" is comprised in two data packets, namely a first data packet and a second data packet. The first data packet and the second data packet are consecutive data packets. If the first data packet is received successfully by communications router 108, but the second data packet is not received by communications router 108, communications router 108 creates a new second data packet by using the payload of the first data packet and the payload corresponding to the word "apple" in the audio database. From the first data packet, communications router 108 estimates that the word is "apple", as its payload contains at least some part of the payload corresponding to the word "apple" which is stored in the audio database. Communications router 108 then sends the first data packet and the new second data packet to host 105.

According to one of the embodiments of the present invention, when host 103 transmits video data to host 105, communications router 108 creates missing data packets using interpolation techniques. For example, each frame of the video is encapsulated in a separate data packet. A missing frame encapsulated in a missing data packet can be created by using one or more previous frames encapsulated in one or more previous data packets respectively, and by using one or more next frames encapsulated in one or more next data packets respectively. Techniques such as non-linear interpolation, nearest neighbor interpolation, bilinear interpolation, bicubic interpolation, etc. can be used for estimating and recreating payloads of missing data packets.

According to one of the embodiments of the present invention, communications router 108 uses a text database stored in its storage medium in order to create missing data packets. For example, host 103 is transmitting text data to host 105 through communications routers 106 and 108. Communications router 105 is configured such that each character is transmitted in a separate data packet, and communications router 108 is also be informed that each data packet comprises only one character. A first, second, and third data packet are transmitted consecutively by host 103. Communications router 108 successfully receives the first and third data packets, but does not receive the second data packet. As the second data packet is the missing data packet, the first data packet is a previous data packet, and the third data packet is a next data packet. For illustration purposes, the first data packet contains the character "a", and the third data packet contains the character "d". Communications router 108 determines that the second data packet is missing, and that the payloads of the first, second, and third data packet form a three character word. Communications router 108 then look up the dictionary in order to determine a word. Since the first character of the three character word is determined to be "a" and the third character of the three character word is determined to be "d", communications router 108 may estimate the second character to be "n".

However, given the first character and the third character another possibility may be that the word is "add". In one variant, communications router 108 selects a word from various possibilities for words at random. In another variant, communications router 108 selects a word based on historical data. For example, if, according to previous data packets, probability of the word being "add" is higher than the probability of the word being "and", communications router 108 selects "add". Therefore, the new data packet created has a payload corresponding to the character "d".

In one variant, communications router 108 determined that the word is a three character word with the help of a "space" character or any character corresponding to a punctuation mark. Alternatively, data packets corresponding to a first or last character of a word comprises an indicator which indicates that the data packet comprises a first character or last character of a word.

According to one of the embodiments of the present invention, when host 103 transmits multimedia data to host 105, various interpolation techniques can be implemented to create missing data packets. For example, host 103 implements transform coding for audio data packets and then transmits the audio data packets to host 105. The audio data packets therefore comprises transform coefficients. If there is a missing audio data packet, and communications router 108 receives a previous audio data packet and a next audio data packet, communications router 108 is able to create the missing audio data packet using the transform coefficients of the previous and next audio data packets. In one variant, an average of the transform coefficients of the previous and next audio data packets can be calculated and used as a new transform coefficient corresponding to the missing audio data packet. The missing audio data packet is then created by applying inverse transformation on the new transform coefficient. In another variant, different weights are assigned to the transform coefficients of the previous and next audio data packets. The weighted transform coefficients are then added to provide the new transform coefficient corresponding to the missing audio data packet.

It should be appreciated that, in all the above examples, instead of using one previous data packet and one next data packet, a plurality of previous and next data packets may be used for creating a missing data packet.

According to one of the embodiments of the present invention, when communications router 108 receives data packets from host 103 through internet 110, communications router 108 stores data packets temporarily for a predefined time period. The data packets are stored in a storage medium of communications router 108 so that they can be used for recreating any missing data packets. When there is a missing data packet, stored data packets can be used by communications router 108 to recreate the missing data packet. For example, data packets with GSNs 0001, 0002, 0003, and 0004 are received at communications router 108, and stored in the storage medium. Data packet with GSN 0005 is not received, and is hence a missing data packet. Communications router 108 then calculates an average value of payloads of data packets with GSNs 0001, 0002, 0003, and 0004. The average value is then used as the payload of a new data packet created, and GSN 0005 is assigned to the new data packet. The new data packet is then transmitted to host 105.

In one variant, the predefined time period is set by user and/or administrator of communications router 108. In another variant, the predefined time period is determined based on overall latency experienced by data packets sent from communications router 106 to 108. For illustration purposes, when communications router 108 is configured to use at least four data packets to create a missing data packet, the predefined time period is set such that at least four data packets are stored in the storage medium at a given time. Therefore, in order to set the predefined time period, the time required for receiving each data packet, i.e. latency, is determined and the predefined time period is calculated based on the latency.

According to one of the embodiments of the present invention, a missing data packet is created by an approximation function. The approximation function uses regression of payloads of a plurality of previous data packets to determine payload of the missing data packet. For example, a regression analysis model is created with a dependent variable and an independent variable. The dependent variable is value of payload. In one variant, the independent variable is GSN. Alternatively, the independent variable is time. Payload of the missing data packet is estimated using the regression analysis, and hence the missing data packet is recreated and sent to host 105.

For example, data packets with GSN 0001, 0002, 0003, 0004, 0005, 0006, and 0007, 0008, 0009, 0010, and 0012 are received at communications router 108. A data packet with GSN 0011 is missing. Therefore communications router 108 recreates payload of the missing data packet by creating a regression analysis model of the payloads of the received data packets. The dependent variable (P) is payload value of the data packets, and the independent variable (X) is GSN of the data packets. The payload values (P1, P2, P3, P4, P5, P6, P7, P8, P9, P10, P12) of the received packets and the regression analysis model is illustrated below:

P1=97
P2=98
P3=99
P4=100
P5=101
P6=102
P7=103
P8=104
P9=105
P10=106
P12=108

Therefore, the when a regression analysis model is created for the payload values against the corresponding GSNs, an approximation function is obtained as follows:

P=96+X

Using this approximation function, payload of the missing data packet, P11, with GSN 0011 is calculated as follows:
P11=96+0011=107

Therefore, communications router 108 recreates the missing data packet with payload value equal to 107.

It should be noted that the payload values in the above examples are exemplary values for easier illustration. It would be appreciated that payload values of packets commonly may be larger and data packets are larger in size.

According to one of the embodiments of the present invention, host 105 is configured to perform estimation and recreate missing data packets. For example, a software, a program or an application can be installed at host 105 for recreating the missing data packets using the techniques discussed above.

BRIEF DESCRIPTION OF DRAWINGS

FIG. 24 illustrates a flowchart depicting a method for increasing throughput of a bonded connection in accordance with an embodiment of the present invention;

FIG. 4B is a chart that illustrates possible values for the fields of the feedback packet of FIG. 4A;

Figure 1A:
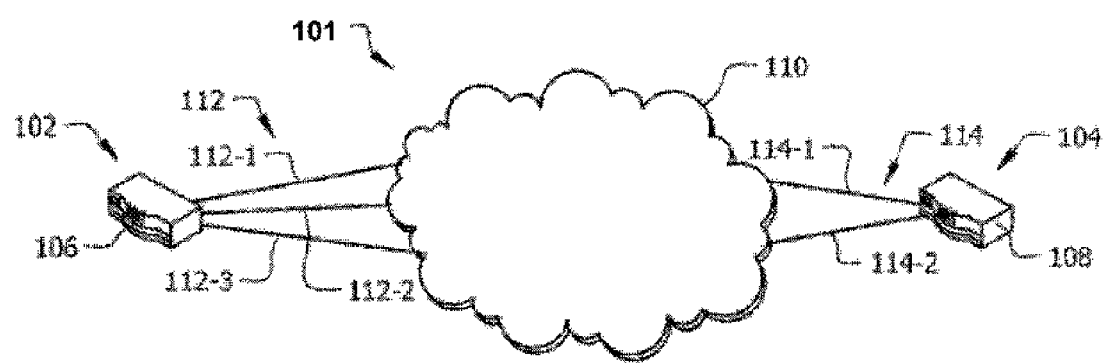
FIG. 1A illustrates an overall system for optimizing throughput of multiple variable bandwidth connections in accordance with an embodiment of the present invention.
Figure 1B:
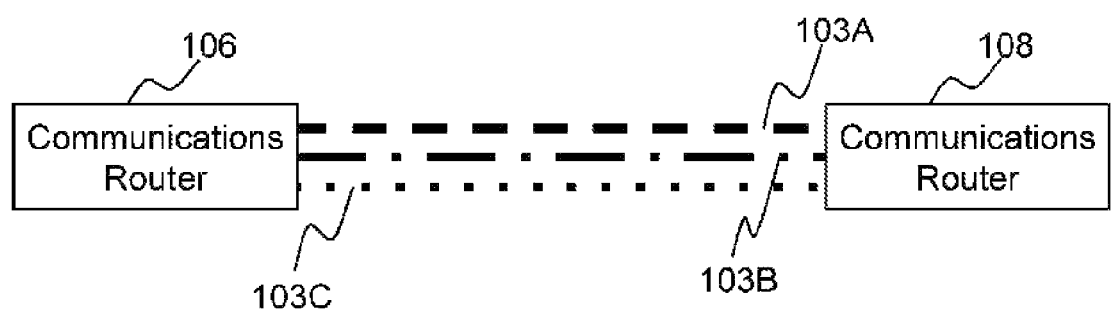
FIG. 1B illustrates a network environment according to various embodiments of the present invention.
Figure 1C:
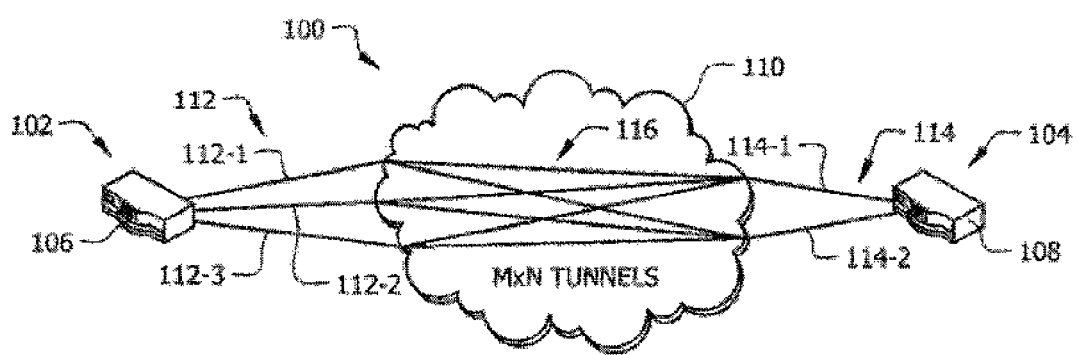
FIG. 1C illustrates system 100 adapted according to embodiments configured to optimize the throughput of bonded multiple variable bandwidth connections.
Figure 2A:
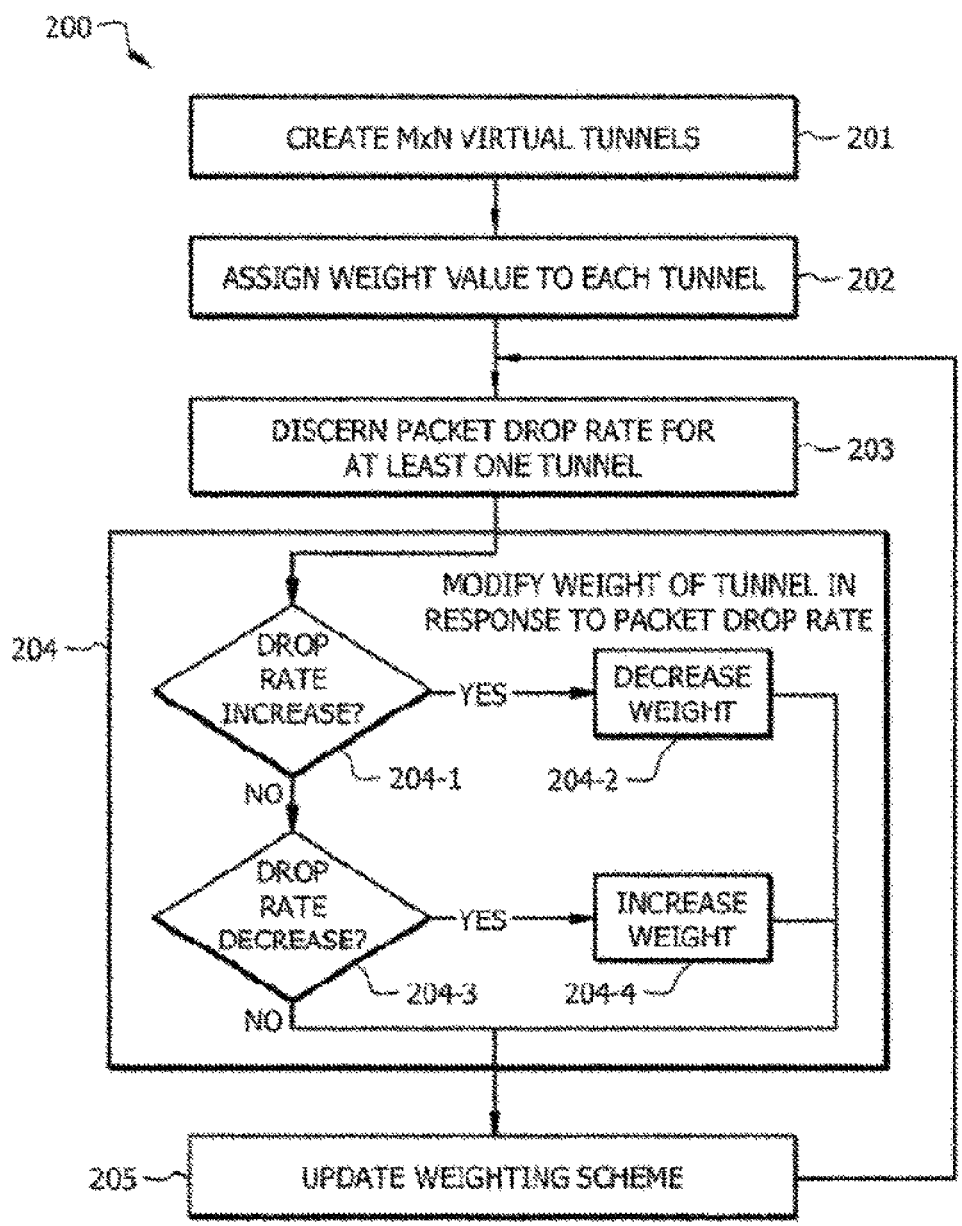
FIG. 2B illustrates a flowchart depicting a method for increasing throughput of a bonded connection in accordance with an embodiment of the present invention.
Figure 2B:
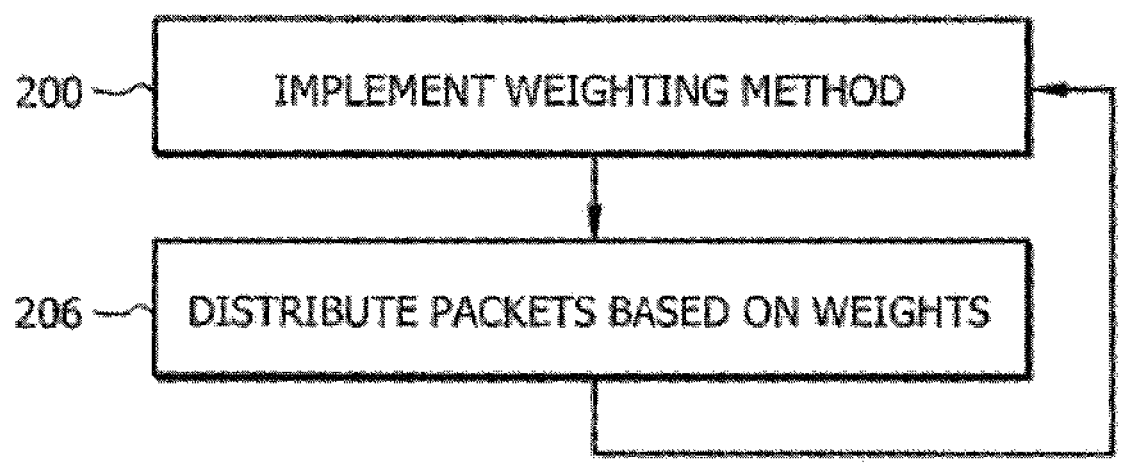
Figure 3:
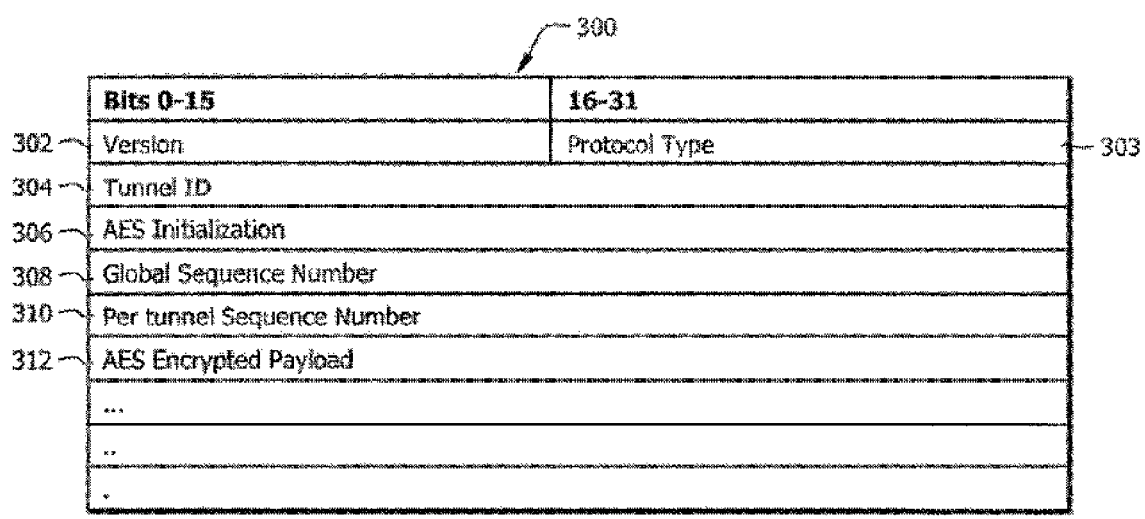
FIG. 3 is an example embodiment illustrating the type of information which may be encapsulated in a transmitted IP packet in accordance with an embodiment of the present invention.
Figure 4A:
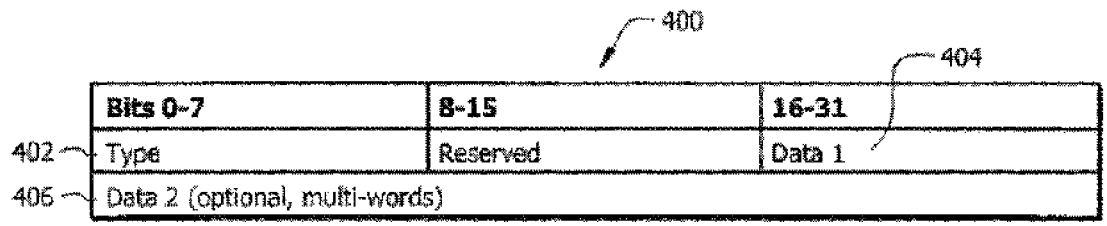
FIG. 4A is an example embodiment illustrating the type of information which may be encapsulated in a feedback packet in accordance with an embodiment of the present invention.
Figure 5:
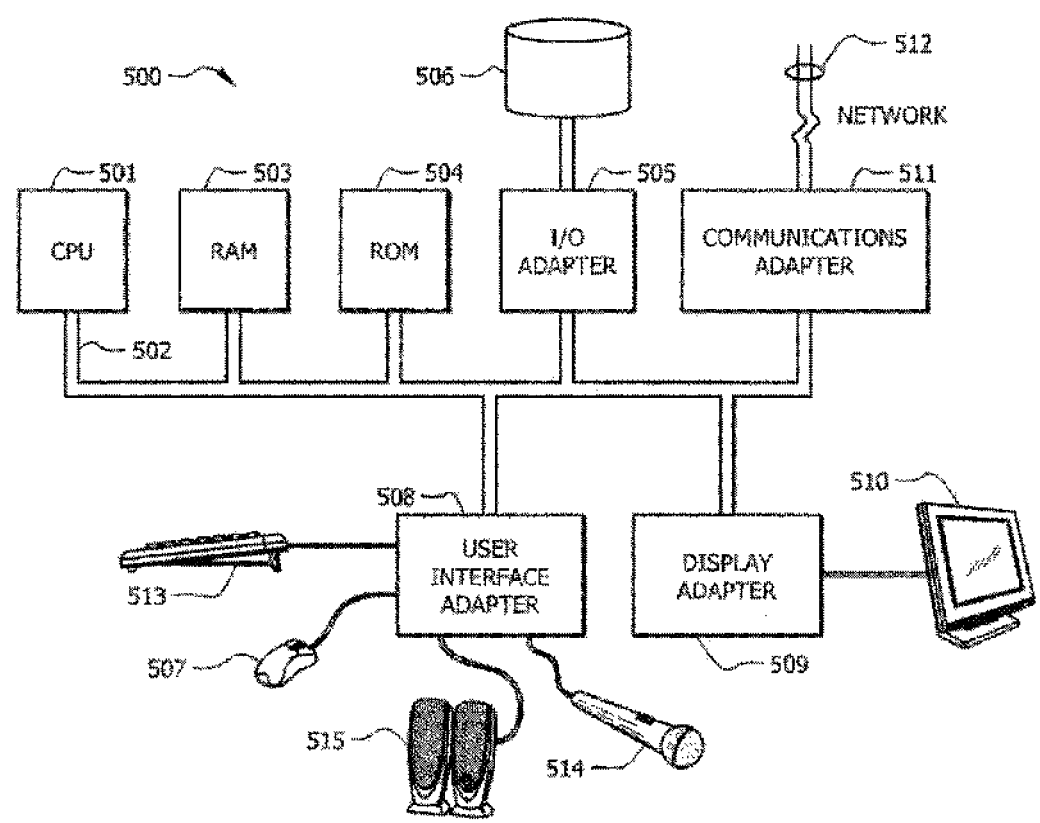
FIG. 5 depicts a block diagram of a processing system which is adapted to implement the present invention.
Figure 6:
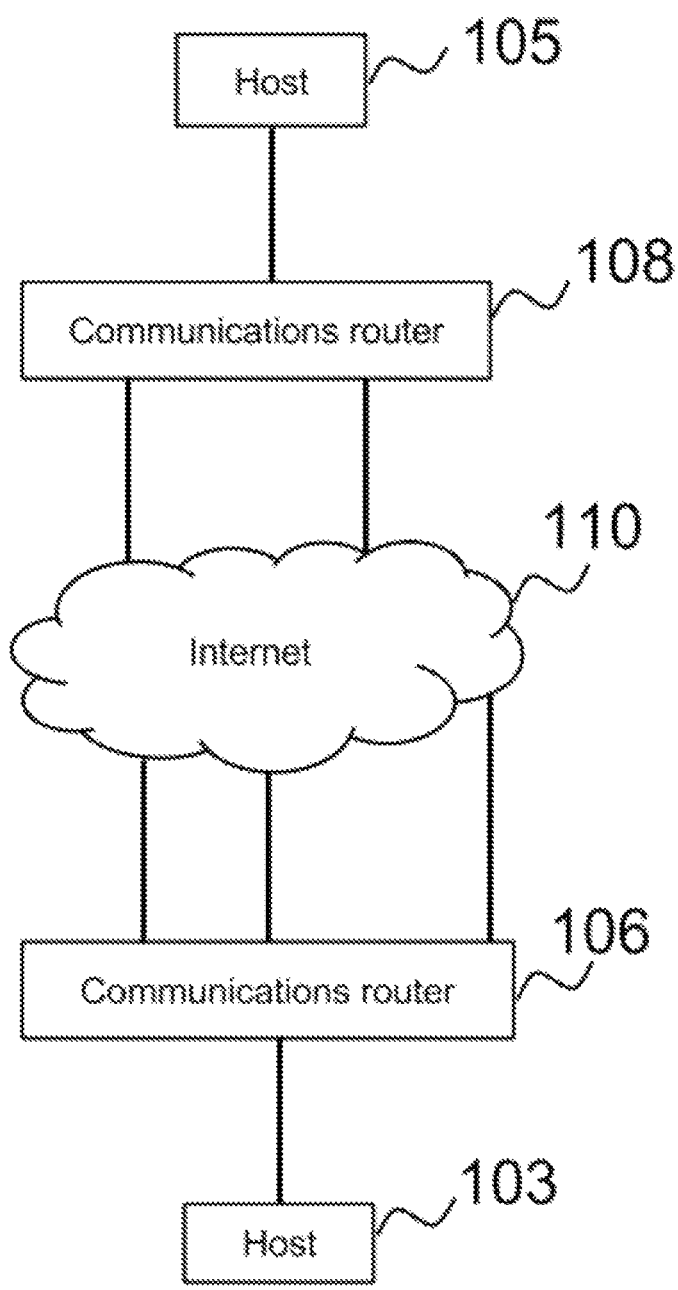
FIG. 6 illustrates a network environment according to one of the embodiments of the present invention.
Figure 7:
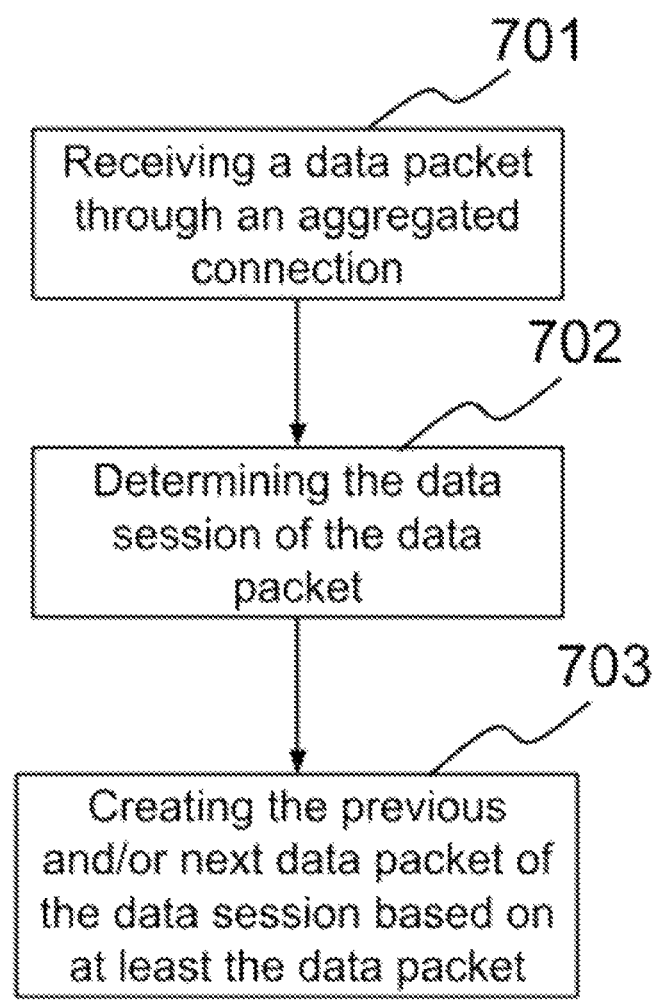
FIG. 7 is a flowchart illustrating a process according to one of the embodiments of the present invention.
Figure 8:
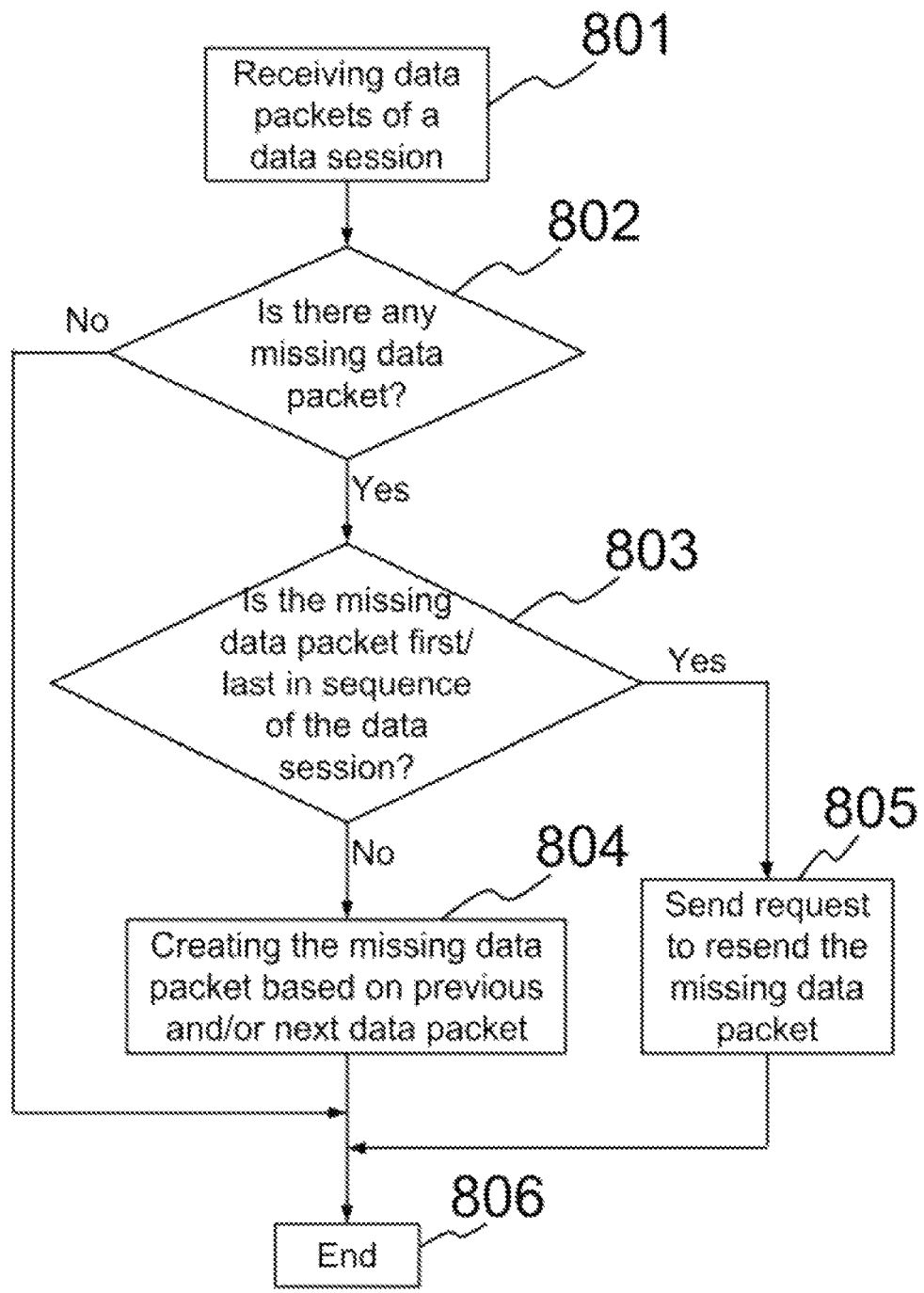
FIG. 8 is a flowchart illustrating a process according to one of the embodiments of the present invention.

The invention claimed is:

1. A method carried out at a first communications router for recreating missing data packets of a data session established between the first communications router and a second communications router through an aggregated connection, comprising the steps of:
   a. receiving data packets belonging to a data session from the second communications router through the aggregated connection, wherein the data packets are destined to a first host reachable through the first communications router;
   b. transmitting the data packets to the first host;
   c. determining whether there is one or more missing data packets; if there is one or more missing data packets:
   d. determining global sequence number(s) (GSN) and per tunnel sequence numbers (PTSN) of the one or more missing data packets;
   e. recreating payload(s) of a first one or more missing data packet(s) and a second one or more missing data packet(s); and
   f. transmitting one or more new data packets comprising payload of the one or more missing data packets, wherein the one or more new data packets are assigned with GSN(s) and PTSN(s) of the one or more missing data packets;
   wherein step (e) is performed for the first one or more missing data packet(s) substantially based on a variance value and an average value of payloads of one or more previous data packets of the same data session and/or one or more next data packets of the same data session, wherein payload of the missing data packet is calculated using a combination of the average and standard deviation of payloads of the one or more previous data packets and/or one or more next data packets.

2. The method of claim 1, wherein step (e) is performed for the second one or more missing data packet(s) substantially based on an average value of payloads of the one or more previous data packets and/or one or more next data packets.

3. The method of claim 1, wherein step (e) is performed substantially based on a lookup of an audio database.

4. The method of claim 1, wherein step (e) is performed for the second one or more missing data packet(s) substantially based on using one or more of non-linear interpolation, nearest neighbor interpolation, bilinear interpolation, and bicubic interpolation.

5. The method of claim 1, wherein step (e) is performed for the second one or more missing data packet(s) substantially based on a lookup of a text database; wherein when there is more than one possibility for payload of the missing data packet, selecting, one of the more than one possibility based on probability generated from historical data.

6. The method of claim 1, wherein step (e) is performed for the second one or more missing data packet(s) substantially based on:
  i. calculating an average of transform coefficients of one or more previous data packets and/or one or more next data packets; wherein the average of transform coefficients is used as a first transform coefficient of the missing data packet; and
  ii. applying inverse transformation on the first transform coefficient; wherein the missing data packet is recreated based on the inverse transformation of the first transform coefficient.

7. The method of claim 1, wherein step (e) is performed for the second one or more missing data packet(s) by:
  i. creating a regression analysis model using payloads of one or more previous data packets and/or one or more next data packets, wherein payload of a data packet is a dependent variable;
  ii. determining an approximation function from the regression analysis model;
  iii. calculating payloads of the one or more missing data packets using the approximation function.

8. The method of claim 7, wherein independent variable of the regression analysis model is time, GSN of data packets, or a combination of time and GSN of data packets.

9. A system comprising a first communications router and a second communications router, wherein the first communications router comprising:
  a plurality of network interfaces;
  at least one processing unit;
  at least one non-transitory local storage medium storing program instructions executable by the at least one processing unit for recreating missing data packets of a data session established between the first communications router and the second communications router through an aggregated connection, comprising the steps of:
  a. receiving data packets belonging to a data session from the second communications router through the aggregated connection, wherein the data packets are destined to a first host reachable through the first communications router;
  b. transmitting the data packets to the first host;
  c. determining whether there is one or more missing data packets;
  if there is one or more missing data packets:
  d. determining global sequence number(s) (GSN) and per tunnel sequence numbers (PTSN) of the one or more missing data packets;
  e. recreating payload(s) of a first one or more missing data packet(s) and a second one or more missing data packet(s); and
  f. transmitting one or more new data packets comprising payload of the one or more missing data packets, wherein the one or more new data packets are assigned with GSN(s) and PTSN(s) of the one or more missing data packets
  wherein step (e) is performed for the first one or more missing data packet(s) substantially based on a variance value and an average value of payloads of one or more previous data packets of the same data session and/or one or more next data packets of the same data session, wherein payload of the missing data packet is calculated using a combination of the average and standard deviation of payloads of the one or more previous data packets and/or one or more next data packets.

10. The system of claim 9, wherein step (e) is performed for the second one or more missing data packet(s) substantially based on an average value of payloads of the one or more previous data packets and/or one or more next data packets.

11. The system of claim 9, wherein step (e) is performed for the second one or more missing data packet(s) substantially based on a lookup of an audio database.

12. The system of claim 9, wherein step (e) is performed for the second one or more missing data packet(s) substantially based on using one or more of non-linear interpolation, nearest neighbor interpolation, bilinear interpolation, and bicubic interpolation.

13. The system of claim 9, wherein step (e) is performed for the second one or more missing data packet(s) substantially based on a lookup of a text database; wherein when there is more than one possibility for payload of the missing data packet, selecting one of the more than one possibility based on probability generated from historical data.

14. The system of claim 9, wherein step (e) is performed for the second one or more missing data packet(s) substantially based on:
  i. calculating an average of transform coefficients of one or more previous data packets and/or one or more next data packets; wherein the average of transform coefficients is used as a first transform coefficient of the missing data packet; and
  ii. applying inverse transformation on the first transform coefficient; wherein the missing data packet is recreated based on the inverse transformation of the first transform coefficient.

15. The system of claim 9, wherein step e) is performed for the second one or more missing data packet(s) by:
  i. creating a regression analysis model using payloads of one or more previous data packets and/or one or more next data packets, wherein payload of a data packet is a dependent variable;
  ii. determining an approximation function from the regression analysis model;
  iii. calculating payloads of the one or more missing data packet using the approximation function.

16. The system of claim 15, wherein independent variable of the regression analysis model is time, GSN of data packets, or a combination of time and GSN of data packets.

* * * * *